United States Patent [19]

Lamb

[11] 4,399,667
[45] Aug. 23, 1983

[54] APPARATUS FOR CHILLING A PLURALITY OF FOOD TRAYS

[75] Inventor: Richard C. Lamb, Southington, Conn.

[73] Assignee: UOP Inc., Des Plaines, Ill.

[21] Appl. No.: 383,423

[22] Filed: Jun. 1, 1982

[51] Int. Cl.³ .............................................. F25D 25/02
[52] U.S. Cl. ........................................ 62/382; 62/388; 62/455; 165/48 R; 165/DIG. 26; 312/236
[58] Field of Search ................. 62/382, 384, 387, 388, 62/440, 448, 454.5; 165/48 R, DIG. 25, DIG. 26; 312/214, 236

[56] References Cited

U.S. PATENT DOCUMENTS

| | | | |
|---|---|---|---|
| Re. 30,623 | 5/1981 | Schulz et al. | 165/48 |
| 3,517,899 | 6/1970 | Vernon | 244/118 |
| 3,866,435 | 2/1975 | Frank et al. | 62/388 |
| 3,866,436 | 2/1975 | Frank et al. | 62/388 |
| 3,976,122 | 8/1976 | Neidhardt | 165/48 R |
| 4,005,745 | 2/1977 | Colato et al. | 165/2 |
| 4,103,736 | 8/1978 | Colato et al. | 165/48 R |
| 4,346,756 | 8/1982 | Dodd et al. | 165/48 R |

Primary Examiner—Ronald C. Capossela
Attorney, Agent, or Firm—James R. Hoatson, Jr.; Barry L. Clark; William H. Page, II

[57] ABSTRACT

Improved chilling apparatus for aircraft meal tray storage and/or serving carts utilizes a slidable tray type of bunker member for receiving dry ice or other cooling material. The bunker member is preferably of thermoformed plastic, is insulated on its bottom and sides, and has a channeled bottom which supports pieces of dry ice while permitting air to be circulated by a blower under the dry ice pieces as well as around and over them. At its downstream end, the bunker has an air flow turning surface and an air discharge opening through its bottom. At its upstream end, an opening directs return air which has passed over the meal trays to an angularly positioned blower located in the cart housing above the inlet end of the bunker.

11 Claims, 5 Drawing Figures

APPARATUS FOR CHILLING A PLURALITY OF FOOD TRAYS

BACKGROUND OF THE INVENTION

The invention relates to food tray-containing carts of the general type used by airlines and hospitals to hold food until it is ready to be served. More particularly, the invention relates to the mechanism by which the food trays are kept in a chilled condition from the time they leave the place of preparation until they are removed from the cart. As noted in copending Dodd application Ser. No. 321,852, filed Nov. 16, 1981, the majority of known cart systems for holding trays use one cart or a portion thereof for holding trays in a chilled atmosphere and another cart or a portion thereof for holding the containers for the hot portion of the meal. The hot meal containers are commonly fully cooked and then merely kept warm in the cart, or else they are partially cooked and kept warm and then brought up to a high temperature before serving. An example of a system wherein a portion of a cart is chilled while another portion is heated is disclosed in Vernon U.S. Pat. No. 3,517,899. Examples of improved systems wherein the hot and cold foods are positioned on a single tray which is kept in a refrigerated atmosphere, with the hot containers being heated by underlying heater plates before serving, are disclosed in Shulz et al., U.S. Pat. No. Re. 30,623 and in Dodd et al., U.S. Pat. No. 4,346,756. Each of the aforementioned applications and reissue patent are assigned to the same assignee as the present application and their disclosures are incorporated by reference herein.

The aforementioned Dodd application, Ser. No. 321,852 discloses a chilling system which utilizes a tray or bunker member containing dry ice or other cooling material to eliminate much of the weight, expense and space requirements of mechanical refrigeration systems which are built into aircraft. The particular bunker member disclosed has an opening in its end wall at its inlet end which is adapted to abut a blower fan mounted in the cart. This particular arrangement, although quite functional, permits the bunker to be installed from only one end of the cart, whereas airlines would probably prefer to be able to install it from either end since they are accustomed to loading food trays from either end. The position of the blower in horizontal alignment with the removable bunker causes it to be exposed to possible damage from the careless use of high pressure steam or hot water hoses used to clean the carts after every use. Finally, since the flat interior bottom of the disclosed bunker would prevent air from contacting the entire bottom surface of the dry ice pieces, it was found desirable to position a second layer of dry ice on top of a perforated plastic intermediate shelf member to maximize the cooling rate.

SUMMARY OF THE INVENTION

It is an object of the present invention to provide an improved, self contained, chilling system for a food service cart which supports pieces of dry ice in a bunker for maximum heat transfer relative to a stream of circulating air moving through the cart. Another object is to provide a food service cart which can be readily cleaned without causing damage to the air circulating blower. Yet another object is to provide a dry ice bunker and food service cart which cooperate with each other so that the bunker can be loaded from either end of the cart, but only in the proper orientation.

These and other objects are attained by the apparatus of the present invention which includes an enclosed food service cart which has the blower for circulating the chilling air located above the dry ice-containing bunker tray adjacent its upstream end. The bunker tray is preferably formed of thermoformed plastic with insulation in its bottom and side walls. The bottom interior surface of the bunker is corrugated and has a cross-section transverse to the air flow direction which provides a plurality of spaced apart dry ice supporting surfaces and intermediate spaced apart channels under the dry ice. The channels permit air to flow under the solid dry ice pieces and force the heavier than air, cold $CO_2$ gas which is emitted from under the dry ice to be rapidly carried out of the bunker and down the inside of the door of the cart at its downstream end. A single layer of $\frac{1}{2}''$ thick pieces of dry ice has been found to provide cooling at a rate at least as great as achieved by two layers of dry ice separated by a perforated retaining shelf in the bunker disclosed in the aforementioned Dodd application. Obviously, by eliminating the need for a certain amount of dry ice there are savings introduced both in the cost of the dry ice and in its weight.

Where the cart is of the type in which the food containers which are to be served hot are heated while on the passenger meal trays, the blower fan is preferably located at an angle in the top wall of the cart. Where the cart is of the split type having a first section for the trays containing the entire meal except for the entree and a second section for the hot entree casseroles, the blower for the chiller would be located above the first section and the first and second sections would be insulated from each other.

DETAILED DESCRIPTION OF THE INVENTION

Figure 1:
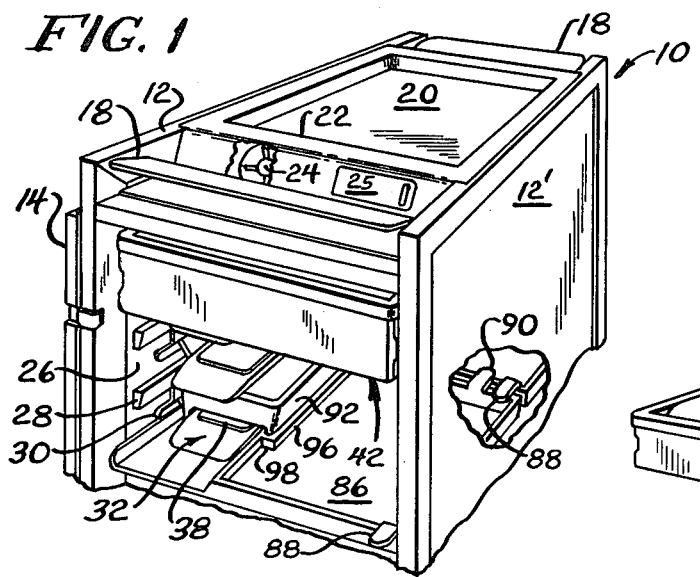
FIG. 1 is a partially broken away, partially fragmentary view of the upper portion of a food serving cart having the improved dry ice bunker mounted therein.

Referring to FIG. 1, the upper portion of a food service cart is indicated generally at 10. The cart comprises an enclosed housing which includes side walls 12, 12' and doors 14, 14' at each end which are hinged to the side walls. The doors are hinged such that they can be positioned generally flush with the ends of the cart when closed and in contact with one of the side walls when open. A latch (not shown) is preferably provided at the top and bottom of each door while a magnet assembly (not shown) is attached to the outer side of wall 12 to retain the door against the side wall when the cart is being moved in an aircraft aisle. At each end of the cart, a conventional brake release member 18 is mounted. These members permit the cart to be moved when the member is depressed, thus releasing the brake pads (not shown) which are frictionally engaged with the floor when the member is not engaged. The top of the cart includes a dry sink portion 20 which serves as a receptacle for coffee pots, glasses and similar items. One end of the dry sink portion 20 is formed by an upwardly extending portion 22 which defines a housing for a circulating fan 24 and an electrical connector plug (not shown) which is recessed under connector cover 25. The interior walls 26, 26' of the cart are preferably formed of thermoformed plastic so as to include integral food tray supporting shelves or ledges 28 and strengthening ribs 30. The wall 26 has separate heater shelf members 32 attached to it by means of a screw 33 (FIG. 4) which passes through vertical support member 34. The ends of the shelf 32 are tapered at 36 and have heater plate portions 38 in their top surfaces for a purpose to be hereinafter described.

Figure 2:
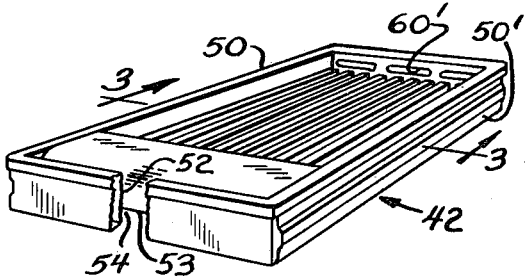
FIG. 2 is a partially broken away perspective view of the improved dry ice bunker.
Figure 3:
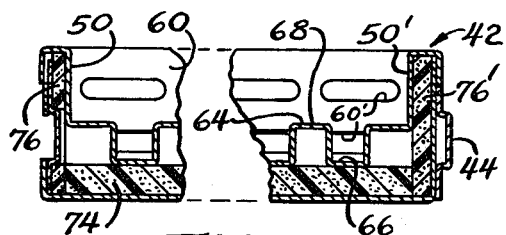
FIG. 3 is a sectional view taken on line 3—3 of FIG. 2.
Figure 4:
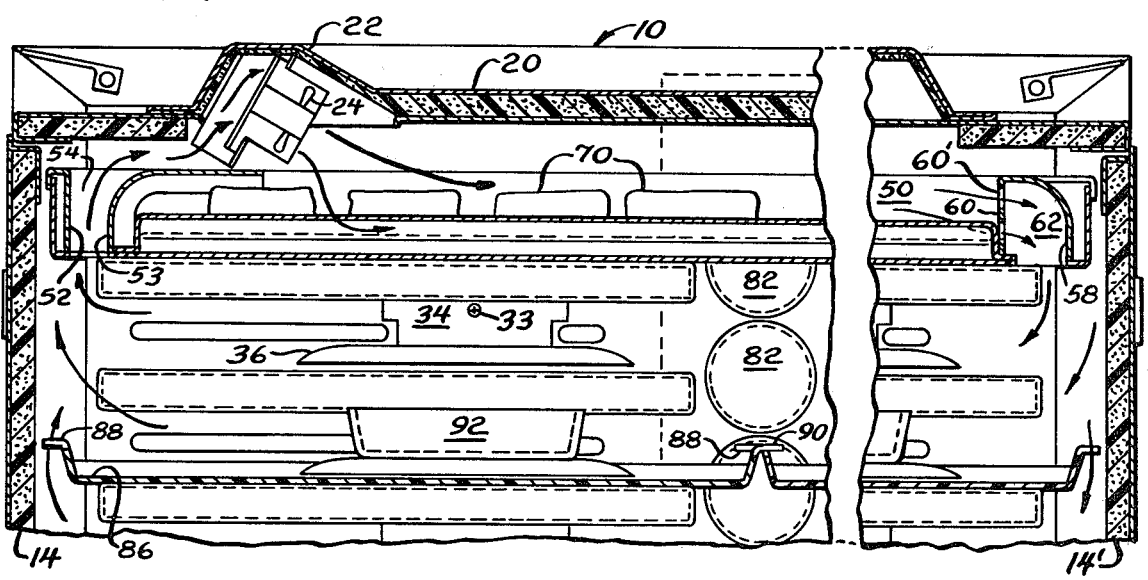
FIG. 4 is a cross-sectional side view taken in a vertical plane through the center of the cart.

Positioned on the uppermost tray shelf or ledge 28 in FIG. 1 is a chiller bunker or tray indicated generally at 42 which is shown more thoroughly in FIGS. 2 and 3. The bunker may be loaded from either end of the cart but may be oriented in only a single direction relative to the cart. This proper orientation is provided by a keying rib 44 positioned on the side of the bunker which cooperates with a complementary groove (not shown) formed in interior wall 26'. The bunker 42 is preferably formed of thermoformed plastic such as ABS and includes hollow side walls 50, 50'. An inlet end outer wall 52 and an inlet end inner wall and flow guide 53 which cooperates with the outer wall to form an air space 54 through which air can pass upwardly to the circulating fan 24 is shown in FIG. 4. The downstream end of the bunker includes an outlet end wall member 58 which cooperates with a slotted end plate member 60 having spaced slots 60' to form an outlet air space 62 through which air is circulated downwardly through the cart as shown in FIG. 4. The respective air spaces 54 and 62 also constitute finger-engagable recesses which permit the bunker to be carried and easily inserted or removed from a cart. The inside bottom of the bunker comprises a corrugated, thermoformed plastic sheet 64 which is shown in FIG. 3 as including a plurality of flat bottom grooved portions 66 and interconnecting flat-topped ridge portions 68. The ridge portions are adapted to provide a flat support surface for pieces of dry ice 70 which are placed within the bunker (FIG. 4). The grooves 66 provide a very efficient flow path for the portion of the air which is blown by the fan 24 under the dry ice pieces. The arrangement is especially efficient since the $CO_2$ gas released from the dry ice is heavier than air and tends to move downwardly into the grooves. In order to prevent the very cold bunker 42 from over-chilling the trays mounted beneath it, a layer of insulation 74 is preferably placed under the corrugated sheets 64. Additional insulation 76, 76' is placed in the side walls of the bunker.

FIG. 4 is a side cross-sectional view through the cart which illustrates the flow path of air inside the cart. The circular members 82 in the center of the cart are snap-in access port covers which permit easy servicing of the electrical connections to each of the individual heater shelves 32. Preferably, the cart 10 is sufficiently long to accommodate two food trays arranged in end-to-end abutting relationship. Since it is necessary for air to be able to flow upwardly along the left door 14 and downwardly along the right door 14', it is preferable that means be provided either in the cart or on the trays to insure that the trays will not inadvertently be permitted to block the air path. The proper results can be achieved by molding integral end tabs 88, 90 in offset relationship on the ends of the tray 86. This relationship assures the proper spacing of the trays from the doors 14, 14' and yet allows the trays to abut each other in the center of the cart.

Figure 5:
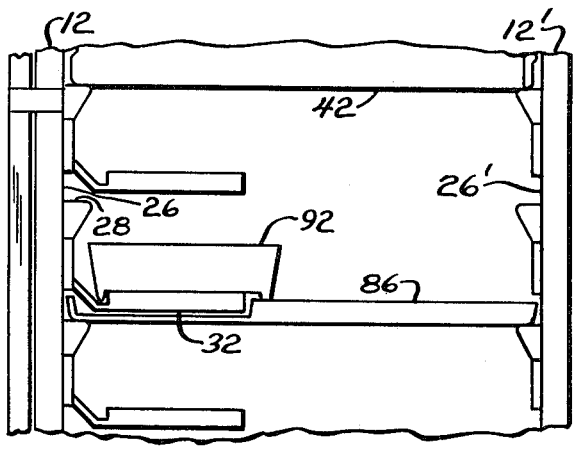
FIG. 5 is a fragmentary end view of the cart of FIG. 1.

For clarity, only a single tray 86 has been illustrated in FIGS. 1, 4 and 5, but it is to be understood that trays are generally placed on each of the tray shelves or ledges 28. The food trays 86 are especially constructed to restrain the hot food containers 92 from longitudinal movement relative to the tray as the tray is slid into the cart along the ledges 28. During this movement, the heater shelves 32 pass under the container 92 and lift it slightly to cause the heater plate 38 to contact the bottom of the container 92. As can be seen in FIGS. 1 and 5, the container has longitudinal legs or runners 94 which are engaged by a tray guide 96 and a transverse abutment portion 98. The tray guide 96 is preferably a pair of spaced guides between which the runner 94 is placed to prevent rotation of the container. Preferably, there is an abutment portion 98 to capture the runner 94 at each end so the container is restrained as it moves with a tray either into or out of the cart.

As can be seen from the preceding description, the construction of the chiller bunker 42, with its channels 66, greatly enhances the efficiency of heat transfer since the downwardly moving cold $CO_2$ gas can be readily picked up by the circulating air stream from the fan 24. The fan 24, by being positioned at an angle, not only helps direct air into the channels 66 and under the dry ice 70, but is well protected from damage by the careless use of high pressure steam or hot water hoses used to clean the cart. The bunker 42 requires only the vertical space of one food tray. The angled fan mounting requires little or no increase in the height of the cart compared to one having a fan mounted on the same level as the bunker since it is desirable for the cart to have the recessed dry sink 20 which requires the raised portion 22. A further advantage of the top mounted fan is that it permits the bunker 42 to be loaded in the cart from whichever end is more convenient. A suitable mounting angle for the fan or blower 24 is about 30° relative to the horizontal. This angle insures that most of the air will be directed lengthwise of the bunker, but that some of it will also get directed under the dry ice. The entire bunker is very light in weight due to its being formed of thin plastic sheets which are bonded to each other by solvents, heat, or other conventional techniques.

I claim as my invention:

1. Apparatus for chilling an enclosed interior portion of a food service cart which has opposed end walls, at least one of which is a door, and a plurality of sets of opposed short shelves or ledges on its side walls which are adapted to receive the opposed edges of a plurality of meal trays, said apparatus comprising a tray-like bunker member having insulated side and bottom wall portions which are adapted to be slidably received on, and supported by, the uppermost of said sets of opposed shelves, said bunker member having a generally flat interior bottom surface which is periodically interrupted by a plurality of spaced grooves or channels which are arranged in a direction parallel to said side walls, said bunker member being adapted to receive pieces of dry ice or other cooling material on said flat bottom surface, said bunker member having an air flow turning surface and a chilled air discharge opening through its bottom wall at a first or downstream end thereof, said turning surface and said discharge opening being positioned so as to receive air which is blown over and around said cooling material as well as air which is blown through said grooves or channels under said cooling material, said discharge opening being adapted to cooperate with a first end wall of said food service cart to direct air downwardly over said first end wall which has previously known drawn upwardly over the opposite end wall of the food service cart and forced over, under and around the cooling material by a blower element mounted in the cart near the opposite end of the bunker member.

2. Apparatus in accordance with claim 1 wherein said bunker member has a vertical inlet opening immediately adjacent its said opposite end for permitting air being circulated upwardly along said opposite end wall of the food service cart to reach a blower element mounted in the cart above said bunker member.

3. Apparatus in accordance with claim 2 wherein said blower is positioned above said bunker at an angle which causes it to direct air downwardly both toward the interior bottom surface of said bunker along its length.

4. Apparatus in accordance with claim 3 wherein said blower is positioned to discharge air at an angle of about 30° from the horizontal.

5. Apparatus in accordance with claim 2 wherein said vertical inlet opening is sealed relative to the cooling material receiving interior of said bunker member defined by said side and bottom surfaces.

6. Apparatus in accordance with claim 5 wherein said inlet opening and said discharge opening are of sufficient size to accommodate the fingers of a person desiring to carry the bunker member or to pull it out of a cart.

7. Apparatus in accordance with claim 1 wherein said bunker member includes a vertical slotted or perforated barrier plate at the downstream end of said flat interior bottom surface for restraining the movement of cooling material placed in the bunker while permitting air moving under or over said cooling material to reach said discharge opening without being impeded.

8. Apparatus in accordance with claim 1 wherein said bunker member is formed of a plurality of pieces of thermoformed plastic sheets which are bonded to each other.

9. Apparatus in accordance with claim 1 wherein said generally flat interior bottom surface is formed by a thermoformed plastic sheet which has a corrugated cross-sectional configuration in a plane transverse to the direction of air flow across it.

10. Apparatus in accordance with claim 9 wherein said corrugated configuration comprises a plurality of alternating generally flat, horizontal top and bottom portions connected by generally vertical wall portions.

11. Apparatus for chilling a plurality of food trays positioned end to end on a plurality of ledges on the interior side walls of an enclosed portion of a food service cart, said apparatus including a tray-like bunker member removably insertable through doors on either end of the cart onto a pair of ledges located immediately above the ledges supporting the food trays, a circulating fan or blower mounted above the upstream end of said bunker member in the upper wall of said cart which defines the top of said enclosed portion, said bunker member being formed and sized so as to direct air flowing upwardly along a first door of the cart to said fan and to direct air blown along said bunker by said fan through a discharge opening in said bunker and downwardly along the second door of the cart, said food trays having raised, laterally offset, longitudinally extending tab portions at each end thereof, said tab portions permitting a pair of longitudinally aligned trays to closely abut each other at the center of the cart but serving to space each of the trays from the adjacent door of the cart, thereby maintaining an open air flow path along the inside surface of the doors.

* * * * *